(12) United States Patent
Eberle et al.

(10) Patent No.: US 11,746,794 B2
(45) Date of Patent: Sep. 5, 2023

(54) METHOD FOR OPERATING A FAN SYSTEM AND FAN SYSTEM HAVING A BACKWARD CURVED CENTRIFUGAL FAN

(71) Applicant: ebm-papst Mulfingen GmbH & Co. KG, Mulfingen (DE)

(72) Inventors: Walter Eberle, Mulfingen (DE); Alexander Rau, Heilbronn (DE); Ralph Wystup, Kuenzelsau (DE); Rainer Nase, Weikersheim (DE); Markus Humm, Weissbach (DE)

(73) Assignee: EBM-PAPST MULFINGEN GMBH & CO. KG, Mulfingen (DE)

( * ) Notice: Subject to any disclaimer, the term of this patent is extended or adjusted under 35 U.S.C. 154(b) by 0 days.

(21) Appl. No.: 17/331,271

(22) Filed: May 26, 2021

(65) Prior Publication Data

US 2021/0372417 A1 Dec. 2, 2021

(30) Foreign Application Priority Data

May 28, 2020 (DE) ..................... 10 2020 114 339.7

(51) Int. Cl.
*F04D 27/00* (2006.01)
*F04D 29/28* (2006.01)
*G05B 13/02* (2006.01)

(52) U.S. Cl.
CPC ......... *F04D 27/004* (2013.01); *F04D 29/281* (2013.01); *G05B 13/027* (2013.01)

(58) Field of Classification Search
CPC .... F04D 27/004; F04D 27/001; F04D 29/281; F04D 29/002; F04D 25/08; F04D 17/16;

(Continued)

(56) References Cited

U.S. PATENT DOCUMENTS 5,736,823 A 4/1998 Nordby et al.
8,672,733 B2 * 3/2014 Chen ..................... F04D 27/004
454/239

(Continued)

FOREIGN PATENT DOCUMENTS

CN 112560338 A * 3/2021 ............. G06F 30/27
DE 29516268 U1 2/1996

(Continued)

OTHER PUBLICATIONS

Filimon et al. DE 10 2009 034 369 (English Translation), translated by EPO Sep. 15, 2022 (Year: 2009).*

(Continued)

*Primary Examiner* — J. Todd Newton
*Assistant Examiner* — Wayne A Lambert
(74) *Attorney, Agent, or Firm* — CANTOR COLBURN LLP

(57) ABSTRACT

A method for operating a fan system as well as such a fan system. The fan system has a control device having an artificial neural network. The control device controls an electric motor of a backward curved centrifugal fan. The centrifugal fan creates a gas flow that is characterized by an actual flow value, particularly the actual value of a volume flow rate. The actual flow value is not detected by a sensor means, but determined by means of the artificial neural network depending from input variables and based thereon, the electric motor is open loop or closed loop controlled by means of the control device. The motor current and the motor voltage as well as their time-dependent behavior that can be the time derivative (e.g. gradient of first order) or that can be at least one preceding value at a preceding point in time, are provided to an input layer of the artificial neural network. It is particularly advantageous, if the artificial neural network determines an actual value of an output (Continued)

pressure that is fed back internally or externally forming an input variable for the input layer.

20 Claims, 5 Drawing Sheets

(58) Field of Classification Search
CPC ......... G05B 13/027; F24F 11/62; F24F 11/75; G06F 30/27; Y02B 30/70; F05D 2270/709
See application file for complete search history.

(56) References Cited

U.S. PATENT DOCUMENTS

| | | |
|---|---|---|
| 9,903,380 B2 * | 2/2018 | Sun ..................... F04D 27/004 |
| 2017/0248149 A1 | 8/2017 | Doumoto et al. |
| 2018/0307211 A1 * | 10/2018 | Aizawa ............. G05B 19/4083 |
| 2019/0376715 A1 | 12/2019 | Blanchard |
| 2020/0217548 A1 * | 7/2020 | Yang ................... F04D 15/0066 |
| 2020/0378391 A1 | 12/2020 | Gotzinger |
| 2021/0056377 A1 * | 2/2021 | Pedicini ................. G06F 17/16 |

FOREIGN PATENT DOCUMENTS

| | | | | |
|---|---|---|---|---|
| DE | 10344795 A1 | * | 4/2004 | ......... B60H 1/00007 |
| DE | 102009034369 B3 | * | 8/2010 | ............. F04D 25/08 |
| DE | 102018104396 A1 | | 8/2019 | |
| EP | 3230596 B1 | * | 2/2019 | ............. F04D 25/08 |
| EP | 3576021 A1 | * | 12/2019 | ........... G05B 13/027 |
| JP | 2017045406 A | * | 3/2017 | ......... G05B 13/0265 |
| KR | 20090089677 A | * | 8/2009 | ........... G05B 23/024 |

OTHER PUBLICATIONS

German Search Report for Application No. 10 2020 114 339.7; dated Jan. 12, 2021.
European Search Report for European Application No. 21175726.5; dated Oct. 12, 2021, 5 pages.

* cited by examiner

METHOD FOR OPERATING A FAN SYSTEM AND FAN SYSTEM HAVING A BACKWARD CURVED CENTRIFUGAL FAN

CROSS REFERENCE TO RELATED APPLICATIONS

This application claims priority under 35 U.S.C. § 119 to the following German Patent Application No. 10 2020 114 339.7, filed on May 28, 2020, the entire contents of which are incorporated herein by reference thereto.

BACKGROUND

The invention refers to a method for operating a fan system as well as such a fan system. The fan system has a control device and a backward curved centrifugal fan. In the backward curved centrifugal fan curved fan blades are arranged that extend from a radial inward side to a radial outward side inclined to a radial plane opposite the rotation direction.

The centrifugal fan has a rotor with fan blades as well as a motor that is configured for driving the rotor.

The open loop or closed loop control of the centrifugal fan shall create a gas flow, particularly an air flow. The flow is characterized by at least one flow parameter that may be described by one or more actual flow values, such as e.g. a pressure or a volume flow rate. It is in many cases desired to control the volume flow rate of the gas flow created by the centrifugal fan in an opened loop or closed loop manner.

If no sensor for measurement of the volume flow rate is present, the problem exists with backward curved centrifugal ventilators that a dependency between the motor current of the motor of the centrifugal fan and the created volume flow rate is not unambiguous in each operating point. Thus, it cannot be readily extrapolated from the motor current and other operating parameters of the centrifugal fan to the created volume flow rate. In addition, a closed loop control of the volume flow rate is difficult without detection of the volume flow actual value by sensor means, because of the numerous external influence and disturbance variables.

In the past trials have already been carried out to solve this problem mathematically or algorithmically in that the backward curved centrifugal fan is described by a model and thus a control can be carried out based on the model. However, it has shown that the adjustment of a desired volume flow rate based on this approach is relatively inaccurate.

BRIEF SUMMARY

Starting therefrom it is an object of the present disclosure to provide a method and a fan system that can be implemented without the measurement of the flow parameter used as open loop or closed loop control variable, but still allows a precise open loop or closed loop control.

Disclosed is a method for operating a fan system comprising a control device and a backward curved centrifugal fan having a motor and a rotor driven by the motor, wherein the fan system is configured to create a gas flow that is characterized by at least one actual flow rate value (pa(kT), Q(kT); pa ($t_{akt}$), Q($t_{akt}$)), wherein the method comprises the following steps: determination of an operation parameter (U(kT); U($t_{akt}$)) forming a correcting variable and characterizing the operation condition of the motor of the centrifugal fan, determination of at least one operation parameter (I(kT); I($t_{akt}$)) forming at least one actual system variable and characterizing at least one operation condition of the motor of the centrifugal fan in a continuous or time-discrete manner, providing the correcting variable (U(kT); U($t_{akt}$)) and the actual system variable (I(kT); I($t_{akt}$)) to the artificial neural network of the control device (11), determination of the at least one actual flow value (Q(kT); Q($t_{akt}$)) by means of the artificial neural network based on the correcting variable (U(kT); U($t_{akt}$)) and the actual system variable (I(kT); I($t_{akt}$)) and the time-dependent change (I((k−1)T); dI) of the actual system variable (I((k−1)T);dI), checking whether the correcting variable (U(kT); U($t_{akt}$)) has to be modified based on the at least one determined actual flow value (Q(kT), Q($t_{akt}$)).

Also disclosed is a fan system including a control device and a backward curved centrifugal fan having a motor and a rotor driven by the motor, wherein the control device is configured to carry out the method according to previous paragraph.

The fan system comprises a control device and a backward curved centrifugal fan. The centrifugal fan has a motor and a rotor that can be driven by the motor. The backward curved centrifugal fan has a rotor with fan blades that extend from a radial inward side to a radial outward side in a curved manner inclined with regard to a radial plane and thereby have an extension opposite the rotating direction of the rotor. The radial inward edge of the fan blade is thus arranged in front of the radial outward edge of the fan blade with view in rotation direction. The side of each fan blade facing in rotation direction is convex and the side facing opposite the rotation direction is concave.

With a rotating rotor a gas flow is created that can be characterized by one or more flow parameters or actual flow values. For example, a volume flow actual value and/or an output pressure actual value can be used as the at least one actual flow value.

The control device of the fan system comprises an artificial neural network for open loop or closed loop control of the at least one actual flow value. For open loop or closed loop control of the at least one actual flow value, operation parameters of the motor and/or the centrifugal fan are used. An operation parameter forming a correcting variable is set by the control device. At least one operation parameter is detected forming at least one system actual variable and can be directly sensorically measured or determined by calculation. The correcting variable and the at least one actual system variable are particularly electrical operation parameters of the motor, such as the motor current, the motor voltage or the frequency of the motor current or the motor voltage.

An operation parameter of the motor used as actual system variable can be determined continuously or in a time discrete manner during the operation. The actual system variable can thus be detected continuously or repeatedly at points in time predefined by a time interval.

If for example the motor current or the motor voltage are modified, the fan system reacts by a change of the actual system variable that also depends from the fan rotation speed. If the motor voltage is used as correcting variable being set, the motor current can be used as actual system variable.

The fan rotation speed and thus the actual system variable also depend from the output pressure or the volume flow rate of the gas flow. Because the fan rotation speed and particularly the time-dependent change thereof is also dependent from the output pressure. Due to the compressibility of the gas and the pressure-dependent density and inertia related therewith, changes of the fan rotation speed are not only dependent from a change of the correcting variable, but also from the present output pressure. The pressure-dependent change of the fan rotation speed is apparent from the time-dependent progress of the at least one actual system variable. This relation can be used in order to train the artificial neural network or to have it learned. The actual system variable and the time-dependent change of the actual system variable, as well as the correcting variable can be transmitted to the artificial neural network and can be used to determine and output a modified correcting variable in case of a change of the actual system variable, such that the desired output pressure and/or volume flow rate of the gas flow is obtained. Due to the consideration of the time-dependent change of the actual system variable, the dependency between the actual system variable and the output pressure and/or the volume flow rate is considered in sufficient resolution.

The rotation speed of the motor or of the rotor that supports the fan blades can be used as fan rotation speed.

The rotor supporting the fan blades of the centrifugal fan is particularly connected with the rotor of the motor in a torque-proof manner such that the motor rotational speed corresponds to the rotor rotational speed.

By means of the artificial neural network the at least one actual flow value of the created gas or air flow can be determined. The determination is based on the operation parameters (particularly motor current and motor voltage) used as correcting variable and as at least one actual system variable and is further based on the time-dependent change of the operation parameter that forms the actual system variable. Preferably also the time-dependent change of the correcting variable is also transmitted to the neural network and is considered during the open loop or closed loop control of the gas flow.

The operating point can be determined, because of the consideration of the time-dependent change. The relation between the operation parameters and the volume flow rate created thereby is not unambiguous in each operating point of the backward curved centrifugal fan such that solely based on the actual values of the correcting variable and the actual system variable a determination of the actual flow value is not possible. If in addition the time-dependent change of the actual system variable is considered, an unambiguous correlation is possible. The open loop or closed loop control of the created gas flow or air flow is possible in this manner without the use of a flow sensor, particularly an output pressure sensor or volume flow rate sensor.

Preferably the motor current or the motor voltage is transmitted to the neural network as correcting variable. In addition, the fan rotation speed or an actual system variable in relation with the fan rotation speed that is not used as correcting variable, e.g. the motor voltage of a motor current, can be transmitted to the artificial neural network. In addition, at least one additional value is transmitted to the artificial neural network such that the time-dependent behavior of the actual system variable can be determined. For example, this additional value can be at least a value of the actual system variable preceding in time or the time derivative of the actual system variable (preferably at least the time derivative of first order). As an option, an additional value can be transmitted to the artificial neural network such that the time-dependent behavior of the correcting variable can be determined. This additional value can be, for example, at least one value of the correcting variable preceding in time or the time derivative thereof (preferably at least the time derivative of first order).

Based on the artificial neural network, a plurality of additional parameters can be considered that influence the created gas flow and that may change and may influence the actual system variable. Such changes may be created due to an increased flow resistance in the system, e.g. if an upstream or downstream arranged filter through which the gas flows is increasingly loaded and thus clogs. In the case of air condition control of a building, the flow characteristics can change, for example, in that the door to a room is opened or closed. With regard to systems in general and analog thereto, volume changes in the suction volume or output flow volume of the ventilator system may effect a changed condition. Additional disturbance or influence variables can be leakages in a flow channel, clogging due to pollution in a flow channel or the like. Also changes of the temperature in the surrounding area, the air humidity in the surrounding area, the pressure in the surrounding area or other conditions in the surrounding area of environment have influence on the gas flow created by the fan system and can be very well considered by means of the artificial neural network. The complexity based on the plurality of influence parameters can be very well mapped by means of the artificial neural network.

Prior to start-up of a fan system, the artificial neural network can be trained based on expert knowledge and/or empirically determined data. In an embodiment the artificial neural network can also be configured to be trained and to learn at the installation location, if additional training data is available. Also the artificial neural network can be configured to be updated, if a version is available that is more up-to-date.

In addition, the artificial neural network can also be able to determine and indicate changes. For example, comparison models that characterize the condition of the artificial neural network can be stored and can be compared with the actual condition of the artificial neural network. Therefrom the actual situation or the actual condition can be determined, e.g. whether a filter is clogged, a door in a room is open or the like. Thus, also a conclusion of an actually present external disturbance variable or influence variable on the open loop or closed loop control is possible.

For learning of the artificial neural network a gradient-based learning algorithm can be used. The size of the artificial neural network can vary. The artificial neural network can have, for example, an input layer, an output layer and one or more hidden layers. The number of neurons in each layer can be equal or different.

It is advantageous, if the control device comprises a regulator to which the control deviation between a predetermined desired flow value and the actual flow value is transmitted. For example, the desired flow value can be a desired volume flow rate value and the actual flow value can be an actual volume flow rate value. The regulator is configured to adjust one or more operation parameters of the motor dependent on the control deviation. The volume flow rate can be used as control variable. Particularly the open loop control or closed loop control of the control device is configured to maintain a constant volume flow rate.

In a preferred embodiment the artificial neural network can comprise at least one feedback, wherein a neuron output value of one layer of the artificial neural network is fed back into a preceding layer in the form of a neuron input value, particularly in the input layer. The feedback can be realized internal of the artificial neural network or external of the artificial neural network. The artificial neural network can be configured as recurrent neural network. For example, an actual flow value determined by the artificial neural network, such as the actual output pressure value and/or the actual volume flow rate value can be fed back to a preceding layer of the artificial neural network, e.g. to the input layer. The feedback serves particularly to allow that the condition of the fan system can be maintained sufficiently stable. In addition, in doing so a floating average determination can be achieved in case of occurring changes based on external disturbance and influence variables.

In an embodiment the artificial neural network comprises an input layer to which the actual value of the correcting variable in the actual point of time, the actual value of the actual system variable in the actual point of time as well as at least one preceding value of the actual system variable—and as an option also of the correcting variable—can be transmitted in a preceding point of time. If an actual value for the actual point of time and a preceding value for a preceding point of time are known, the time-dependent change of the respective operating parameter (actual system variable or correcting variable) can be determined by means of differentiation. Thus, for example, the actual motor voltage, the actual motor current and at least one preceding value of the motor voltage and/or the motor current can be transmitted to the input layer of the neural network in order to be able to consider the time-dependent motor voltage change or motor current change. Based on these values the artificial neural network can determine the actual volume flow rate value and/or the actual output pressure value of the created gas flow.

In another embodiment also at least one time-dependent derivative of the at least one actual system variable and as an option, in addition, a time-dependent derivative of the correcting variable can be transmitted to the input layer of the artificial neural network in addition to the actual value of the correcting variable for the actual point of time and the actual value of the at least one actual system variable for the actual point of time. For example, in case of a continuous measurement of the at least one actual system variable, a time derivation can be carried out by means of a differentiator and can be provided to the input layer. The at least one time derivative comprises preferably at least the first order time derivative.

Each neuron in each layer of the artificial neural network has preferably a non-linear activation function. In a preferred embodiment the activation function can be formed by a so-called rectifier (briefly: ReLU). Also other activation functions can be used as an alternative, e.g. a threshold function or a sigmoid function.

It is advantageous, if the activation function is limited to a maximum value. In doing so, for example, rare characteristics can be better trained or learned. The maximum value of the activation function can be, for example, equal to 6.

Preferred embodiments of the invention can be derived from the dependent claims, the description and the drawings. In the following preferred embodiments of the invention are explained in detail based on the attached drawings. The drawings show:

DETAILED DESCRIPTION

Figure 1:
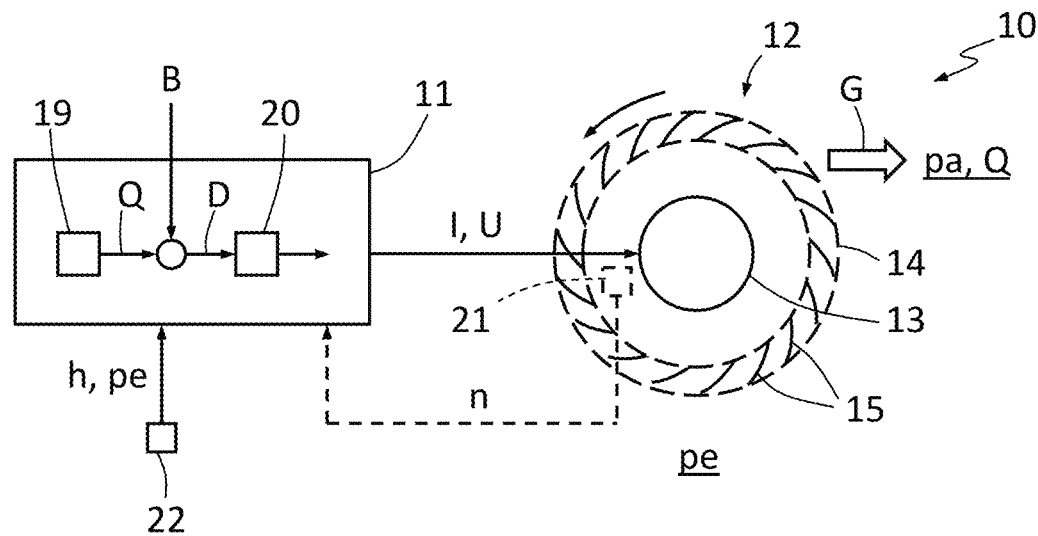
FIG. 1 a highly schematic block diagram of a fan system having a control device and a backward curved centrifugal fan, FIG. 2 a block diagram of an artificial neural network of the control device of the fan system of FIG. 1, FIG. 3 a block diagram of another embodiment of an artificial neural network of the control device of FIG. 1, FIG. 4 a block diagram of a neuron of the artificial neural network of FIGS. 1-3, FIG. 5 an activation function for the neuron of FIG. 4, FIG. 6 an exemplary relation between the volume flow rate, the motor current and the fan rotation speed of the fan system of FIG. 1, wherein the lines of equal volume flow rate are illustrated that intersect with lines of equal output pressure, FIG. 7 an exemplary relation between the fan rotation speed, motor current and the control level of the motor voltage of the fan system of FIG. 1, FIG. 8 an exemplary relation between the fan rotation speed, the volume flow rate and the control level or the motor voltage of the fan system of FIG. 1 and FIG. 9 characteristic curves of a group of characteristic curves that illustrate in an exemplary manner the relation between the volume flow rate and the motor current of the fan system of FIG. 1.

In FIG. 1 a fan system 10 is highly schematically illustrated based on a block diagram. The fan system 10 comprises a control device 11 for open loop control or closed loop control of a backward curved centrifugal fan 12. The backward curved centrifugal fan 12 has a motor, e.g. an electric motor 13 that is operatively connected with a rotor 14 of the centrifugal fan. During rotation the rotor 14 creates a gas flow G, e.g. an air flow, that has an output pressure pa and a volume flow rate Q downstream of the centrifugal fan 12 or downstream of the fan system 10.

The backward curved centrifugal fan 12 or the rotor 14 has fan blades 15 extending between a radial inner edge and a radial outer edge in a curved manner that are arranged uniformly distributed in rotation direction on the rotor 14. With view in rotation direction the radial inner edge is arranged in front of the radial outer edge. The side of each fan blade 15 facing in rotation direction has a convex shape and the opposite side has a concave shape.

The gas flow G can be characterized by at least one flow parameter, e.g. by the output pressure pa or the volume flow rate Q. At least one of the flow parameters and according to the example the volume flow rate Q, can be open loop or closed loop controlled. The open loop or closed loop controlling of the flow parameter of the gas flow G shall be carried out without detection by means of a sensor according to the example, and particularly without the use of a volume flow rate sensor and/or a pressure sensor.

In the embodiment the flow parameter of the gas flow G shall be closed loop controlled to a value that is preset by a desired flow value B by means of the control device 11. The desired flow value B is a desired volume flow rate value and the flow rate value Q thus forms the control variable according to the example. The actual volume flow rate value is not detected by sensor means, but is determined in the control device 11 by means of the use of an artificial neural network 19. Based on the actual flow value determined by the artificial neural network 19, which is the actual volume flow rate value in the present case, the control deviation D can be calculated by calculating the difference from the desired flow value B and can be submitted to a regulator 20 of the control device 11. The regulator 20 can subsequently modify one or more operation parameters of the electric motor 13, e.g. the motor current I or the motor voltage U in order to minimize the control deviation D and to eliminate the control deviation D in the ideal case.

Figure 9:
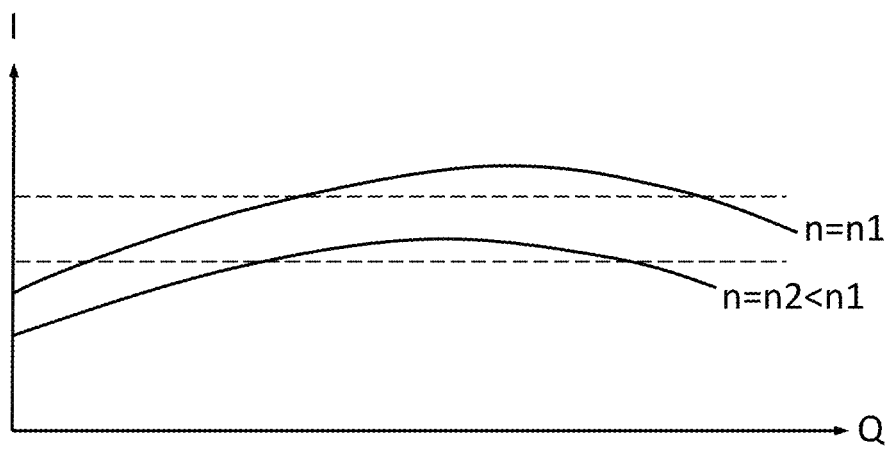

Due to the profile of the fan blades 15, a characteristic curve of the backward curved centrifugal fan 12 is created describing the relation between the motor current I and the volume flow rate Q, as illustrated in FIG. 9. The progress is non-linear and comprises a maximum. The characteristic curve is shifted with increasing fan rotation speed in the direction of higher values of the motor current I in case of constant volume flow rate Q. Due to the curved parabola-like progress, the determination of the motor current I of the electric motor 13 and the fan rotation speed n (rotation speed of the electric motor 13 or the rotor 14), an unambiguous mapping to the created volume flow rate Q of the gas flow G cannot be made, because the operating point is not unambiguous. This ambiguous relation is illustrated by the dashed lines in FIG. 9 describing a constant motor current value respectively that each have two intersection points with the associated characteristic curve.

Figure 6:
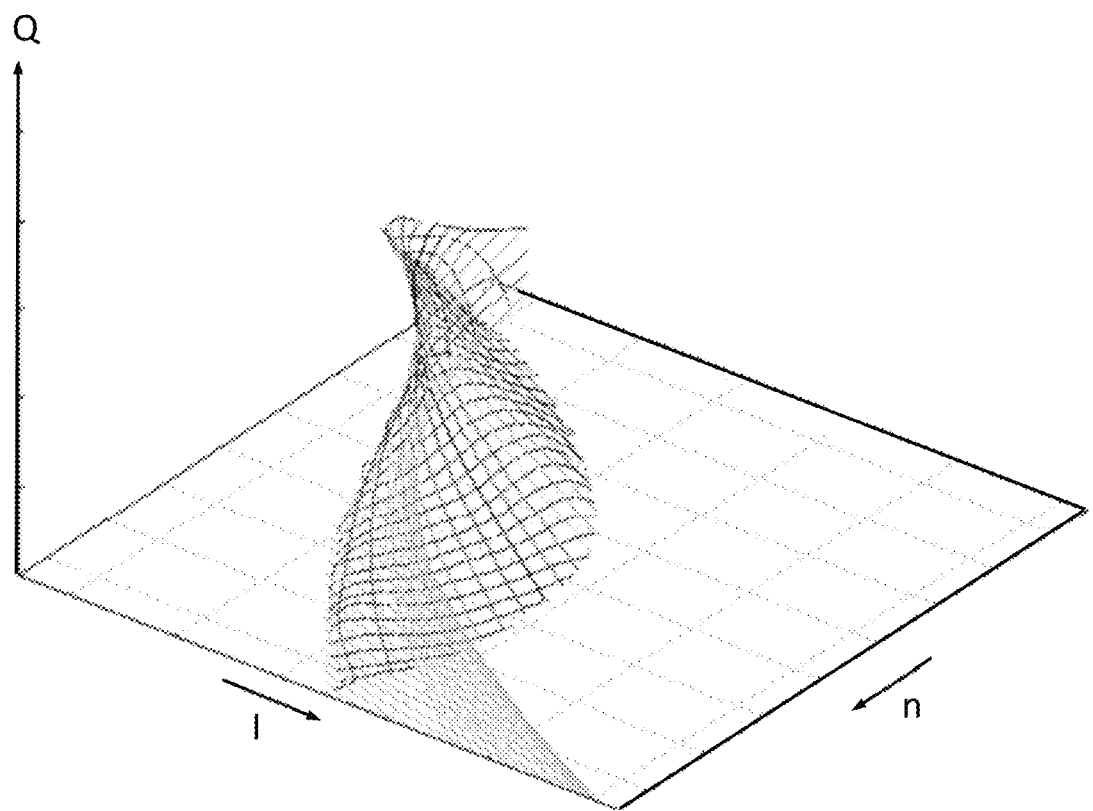
Figure 7:
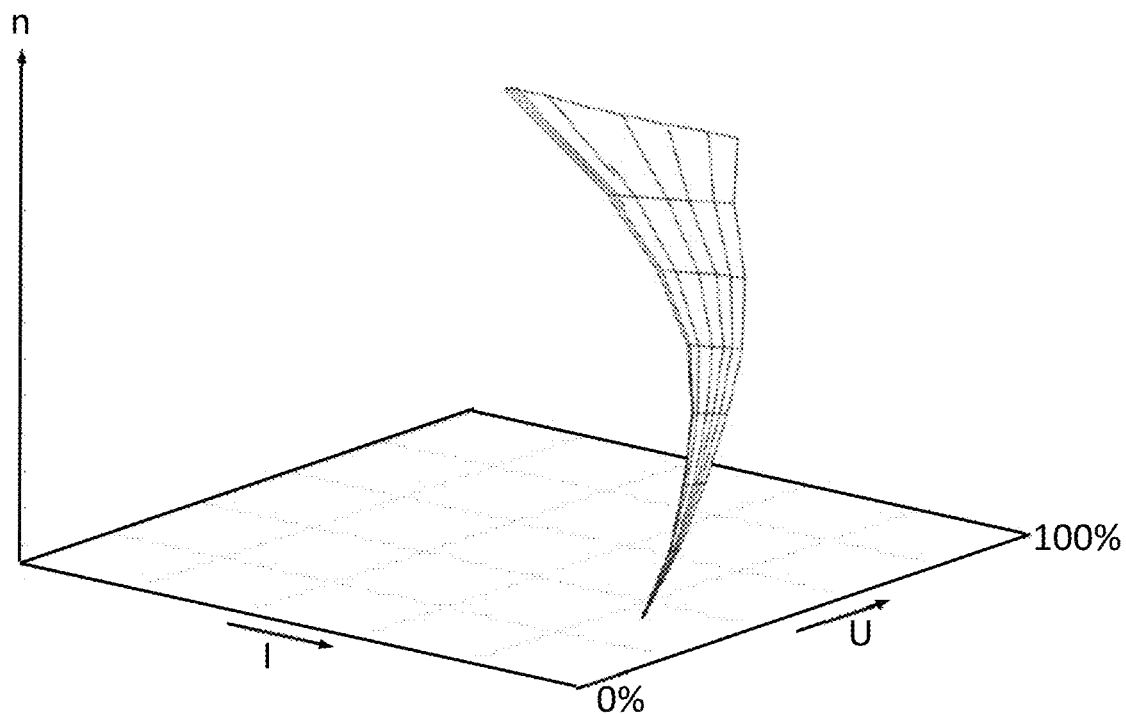
Figure 8:
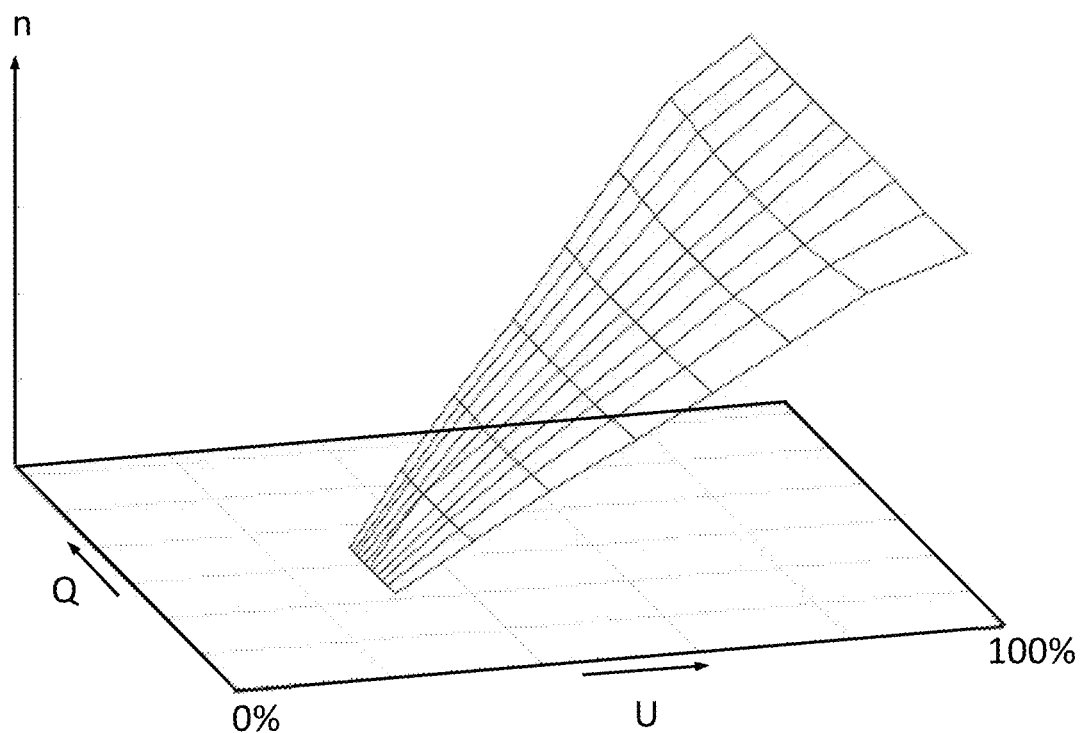

For further illustration of the operation behavior of the backward curved centrifugal fan 12 additional spatial characteristic areas are illustrated in FIGS. 6-8. FIG. 6 shows the relation between the created volume flow rate Q, the output pressure pa, the motor current I and the fan rotation speed n. In FIG. 6 lines of constant output pressure pa intersect the lines of constant volume flow rate Q. FIG. 7 illustrates the relation between the fan rotation speed n, the motor current I and a control level of the electric motor 13 between 0% and 100%, wherein the control level increases with increasing motor voltage U. FIG. 8 shows the relation between the fan rotation speed n, the volume flow rate Q of the gas flow G and the control level of the electric motor 13.

For determination of the fan rotation speed n, a rotation speed sensor 21 can be provided as an option that, however, is preferably omitted. As an option, also at least one additional sensor 22 can be provided in order to detect environmental conditions or other influencing parameters, e.g. the air humidity h and/or the input pressure pe that can, for example, correspond to the air pressure in the surrounding area. Instead of the detection of the input pressure pe by sensor means, it can also be determined in another manner, e.g. by means of a calculation depending on the geographic location of installation of the fan system 10, particularly based on the geographic height above sea level.

Operation parameters of the centrifugal fan 12 and particularly of the electric motor 13 are transmitted to the artificial neural network 19. One of the operation parameters forms a correcting variable and another operation parameter forms an actual system variable. The motor voltage U can be used as correcting variable and the motor current I can be used as actual system variable or as an alternative also vice versa. The actual system value can be calculated, estimated or measured. The desired motor voltage value that is output by means of the control device 11 can be used as motor voltage U such that a measurement of the actual motor voltage value can be omitted. The fan rotation speed n or its change is indirectly monitored according to the example, e.g. by means of the motor current I. As an alternative or in addition, the fan rotation speed n can also be detected by means of the rotation speed sensor 21 and can be submitted to the control device 11.

As an option, the input pressure pe or the air humidity h can be additional input variables for the artificial neural network 19.

Figure 2:
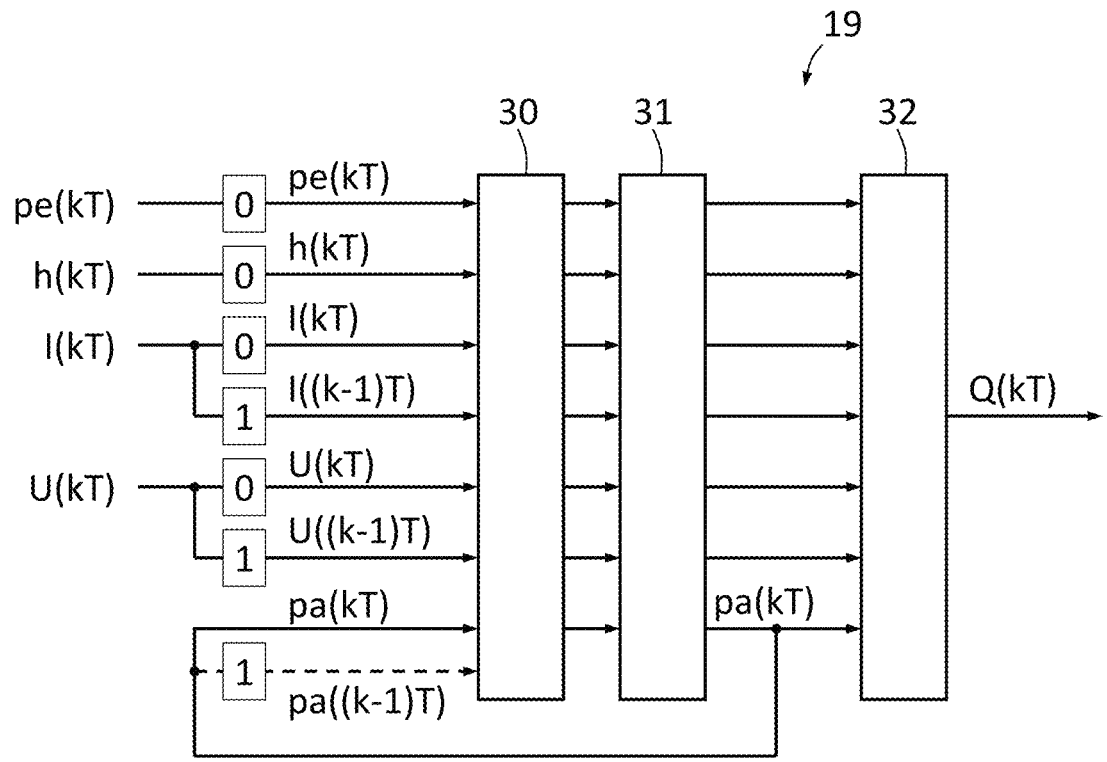

In the control device 11 or the artificial neural network 19 not only respective actual values of the motor voltage U and the motor current I are considered, but also their time-dependent behavior or time-dependent progress. For this, for example, multiple values of the motor voltage U and the motor current I detected in different points of time can be input as input variables in the artificial neural network 19 (FIG. 2). The difference of these values divided through the time distance of the detection is—at least approximately— an inclination value that characterizes the time-dependent change.

Figure 3:
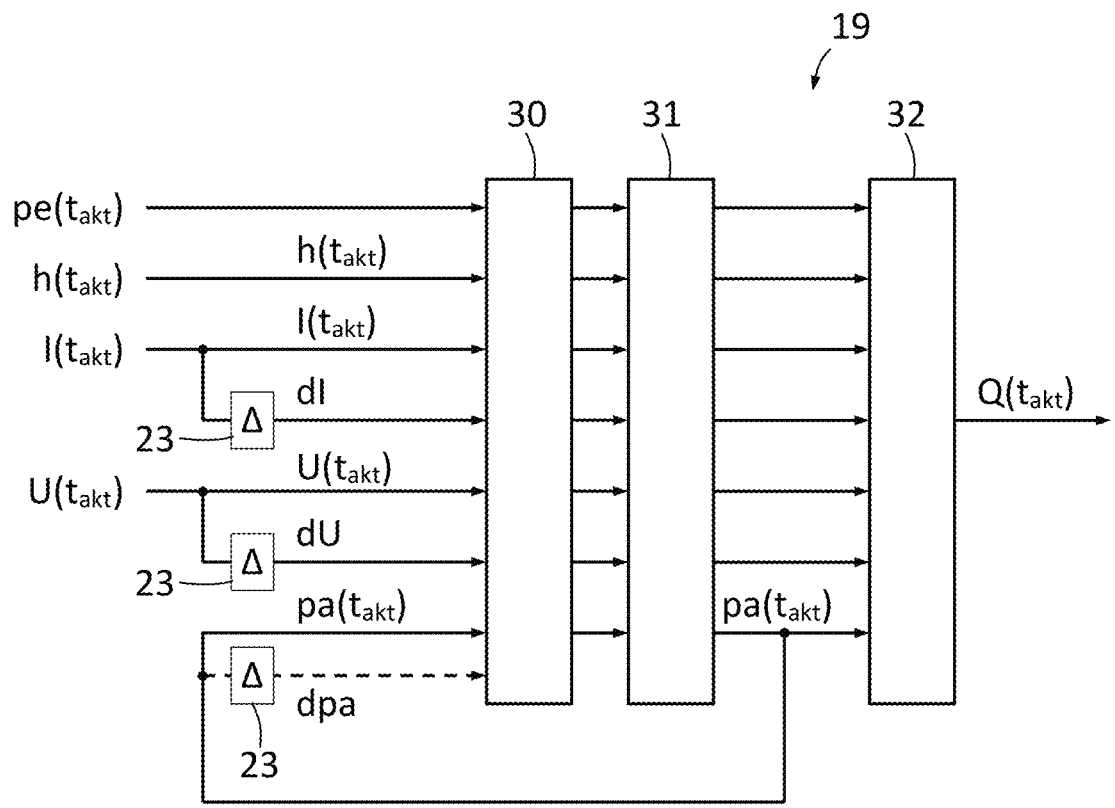

As an alternative, a time derivative can be created by means of differentiators 23, e.g. the motor current change dI and in addition, as an option, a fan rotation speed change do that represent the first order time derivatives of the motor current I or the fan rotation speed n respectively (FIG. 3). In addition or as an alternative, also time derivatives of higher order can be detected and considered. These configurations are particularly suitable, if the operation parameters are detected time continuously. In FIG. 3 the actual values are illustrated by means of the actual measurement point in time $t_{akt}$.

FIG. 2 schematically illustrates the possibility to detect the operation parameters in a time-discrete manner in a time interval T respectively. The actual point in time is represented by the time interval kT. The preceding time interval is characterized by (k−1)T. The time-dependent behavior is characterized for the input variables. The motor current I as well as the motor voltage U are transmitted respectively for the actual time interval in form of an actual motor current value I(kT) and in Form of an actual motor voltage value U(kT) to the artificial neural network 19. In addition, at least one preceding motor current I((k−1)T) and at least one preceding motor voltage value U((k−1)T) are transmitted to the artificial neural network 19 in order to consider the time-dependent behavior.

As already explained, also additional input variables can be submitted to the artificial neural network, as illustrated in FIGS. 2 and 3. All of the input variables can be transmitted also in relation to their time-dependent behavior in addition to the transmission of the respected actual value, e.g. in that a preceding value at a preceding point in time is submitted (FIG. 2) or in that by means of a differentiator 23 the time derivative is determined (FIG. 3). In both cases knowledge about the time-dependent behavior is present in the artificial neural network 19.

The artificial neural network 19 is only schematically represented in FIGS. 2 and 3. It comprises an input layer 30, at least one hidden layer 31 and an output layer 32. Each of these layers 30, 31, 32 of the artificial neural network 19 can comprise an arbitrary number of neurons 33 (FIG. 4) depending on the specific configuration. In the input layer the number of neurons 33 can correspond to the number of input variables, for example, that are transmitted to the input layer 30. In the embodiment one neuron 33 is provided for each actual value of an input variable and for each submitted preceding value (FIG. 2) or for each submitted time derivative (FIG. 3) an additional neuron 33 is provided in the input layer 30. According to the example, at least four or five neurons are provided in the input layer 30.

At least one of the following input variables is transmitted to each neuron 33 in the input layer 30: The actual value of the motor current I(kT), I($t_{akt}$) and/or the actual value of the fan rotation speed n(kT), n($T_{akt}$), the actual value of the motor voltage U(kT), U($t_{akt}$), the actual value of the output pressure pa, the preceding value I((k−1)T) or the time derivative dI of the motor current I and/or the preceding value n((k−1)T) or the time derivative do of the fan rotation speed n. According to the example, also the preceding value U((k−1)T) or the time derivative dU of the motor voltage U is transmitted to the input layer 30. As an option, in addition, also the preceding value pa((k−1)T) of the output pressure (FIG. 2) or the time derivative dpa of the output pressure pa (FIG. 3) can be transmitted to the input layer 30. The submission of the input pressure pe as well as the air humidity h is also optional.

Figure 4:
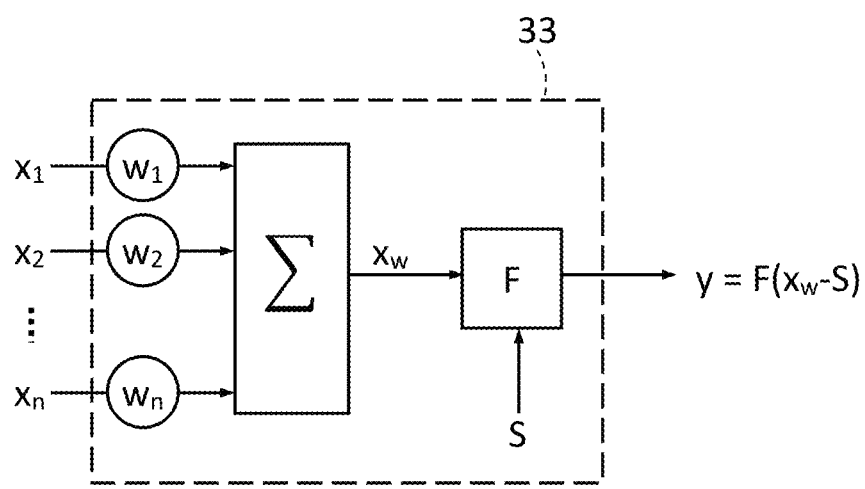

As illustrated in FIG. 4, at least one value of another layer and/or at least one of the indicated input variables is submitted to each neuron 33 at a neuron input in form of a neuron input value $x_1$ to $x_n$. The neuron input values $x_1$ to $x_n$ are weighted by means of a respectively assigned weight $w_1$ to $w_n$ and summed, whereby a weighted sum $x_w$ is obtained. The weighted sum is provided to an activation function F of the neuron 33. The activation function F also depends from a threshold S. Specifically the value of the activation function F is output in the form of a neuron output value y depending on the difference of the weighted sum $x_w$ minus the threshold S: $y=xw-S$. Firing of the neuron 33 is predefined by means of the threshold S.

Alternatively to considering the threshold S as an input parameter in the activation function F also so-called on-neurons can be used, in which a threshold S is considered in the form of a neuron input value $x_0$ during calculation of the weighted sum $x_w$.

Figure 5:
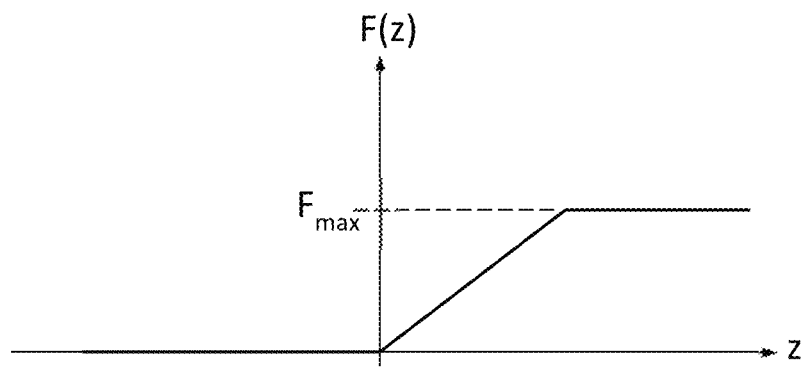

In FIG. 5 one possible activation function F is illustrated only by way of example. According to the example, a rectifier (ReLU) is selected as activation function F. Also other known activation functions for neurons 33 can be used that are preferably non-linear. In the embodiment the neuron output value y is limited to a maximum value $F_{max}$ of the activation function F, e.g. 6. Due to the limitation to the maximum value, rarely occurring features can be better considered during learning of the artificial neural network 19.

The artificial neural network 19 is trained based on known parameters and data and can be used for open loop or closed loop control after training. During the operation it is possible to update the artificial neural network 19. A continuous learning is not provided in the preferred embodiment of the fan system 10, because preferably no sensors 21, 22 are provided.

At least one determined neuron output value y can be fed back from a subsequent layer to a preceding layer. The feedback can be realized internal of the artificial neural network 19 or also external of the artificial neural network 19. The artificial neural network 19 can be configured as recurrent neural network, for example. According to the example, at least one actual flow value is determined in a hidden layer 31 or alternatively in the output layer 32 that is fed back in one of the preceding layers, particularly in the input layer 30. In the embodiments illustrated in FIGS. 2 and 3 an actual value for the output pressure pa is determined in at least one hidden layer 31 and is fed back as input variable to the input layer 30.

Due to the feedback of the output pressure pa into the input layer 30, a very good stability of the closed loop control can be achieved, also if the provided other input variables do not change. In addition, an average calculation can be carried out by use of the determined actual output pressure during the recalculation of the output pressure.

If the flow conditions of the gas flow G change due to external influences, the fan system reacts by changing the fan rotation speed n that can be recognized in the change of the motor current I (actual system variable). The trained artificial neural network 19 determines the assigned actual volume flow rate value of the volume flow rate Q. The regulator 20 then adjusts the motor voltage U (correcting variable) in order to minimize the control deviation D that in turn is fed back to the artificial neural network 19.

The regulator 20 can be realized as software module and/or hardware module. The determination of the control deviation and the correcting variable by regulator 20 is carried out external of the artificial neural network 19 according to the example and can, as an option, also be carried out internal of the artificial neural network 19.

During training different output pressures pa can be adjusted, e.g. by using a Venturi nozzle for differential pressure determination and the artificial neural network 19 can learn based on the value of the output pressure pa without the need to measure the actual value of the volume flow rate Q. As a parameter characterizing the flow conditions for training or learning, the output pressure pa is used, but not the volume flow rate Q, such that a volume flow rate sensor can be omitted. The use of a volume flow rate sensor during training may occur if necessary in order to achieve more accurate training results. Based on this training the artificial neural network 19 can be adapted with sufficient accuracy such that during start-up good control results for the control of the volume flow rate Q are obtained.

The artificial neural network 19 reacts during operation of the fan system 10 also to external changes that have an influence on the operation and effect, for example, a change of the fan rotation speed n. In the control device 11 comparison models for the condition of the artificial neural network 19 can be stored that are assigned to a known disturbance variable or a known environmental parameter. By comparison of the actual condition of the artificial neural network 19 with comparison models, the control device 11 can thus also determine whether and what kind of changes have occurred in the environment or the system. For example, an increasing load of a filter or the clogging of a filter can be determined. Such a change is in relation to the time-dependent behavior not abrupt, but slower compared with other external influences. Due to the consideration of the time-dependent change or the time sequence of values, at least for the actual system variable and where appropriate one or more additional input variables in the artificial neural network 19, conclusions on the kind of external influence can be made. For example, the opening or closing of a door or flap in the suction volume and/or the output flow volume can be determined due to a sudden change of the operation condition (e.g. the fan rotation speed n) of the fan system 10.

Due to the consideration of the time-dependent behavior, particularly the motor current I and/or the fan rotation speed n and/or the motor voltage U, the operating point can be unambiguously determined and for example an actual value of a volume flow rate Q can be unambiguously assigned to a motor current I. For the illustration in FIG. 9 this means that the characteristic line from the group of characteristic lines can be selected based on the actual value of the fan rotation speed n (measured or calculated from the motor current I or the motor voltage U). Based on the change of the motor current I it can be determined whether the motor current I increases or decreases. Dependent therefrom the actual operating point is in the increasing portion of the characteristic line up to the maximum of the motor current I or in the decreasing portion of the characteristic line at volume flow rate values that are larger than the volume flow rate value characterized by the maximum of the motor current I.

The invention refers to a method for operating a fan system 10 as well as such a fan system 10. The fan system 10 has a control device 11 having an artificial neural network 19. The control device 11 controls an electric motor 13 of a backward curved centrifugal fan 12. The centrifugal fan 12 creates a gas flow G that is characterized by an actual flow value, particularly the actual value of a volume flow rate Q. The actual flow value is not detected by a sensor means, but determined by means of the artificial neural network 19 depending from input variables and based thereon, the electric motor 13 is open loop or closed loop controlled by means of the control device 11. The motor current I and the motor voltage U as well as their time-dependent behavior that can be the time derivative (e.g. gradient of first order) or that can be at least one preceding value at a preceding point in time, are provided to an input layer 30 of the artificial neural network 19. It is particularly advantageous, if the artificial neural network 19 determines an actual value of an output pressure pa that is fed back internally or externally forming an input variable for the input layer 30. Additional input variables can be considered additionally as an option.

LIST OF REFERENCE SIGNS

10 fan system
11 control device
12 centrifugal fan
13 motor
14 rotor
15 fan blade
19 artificial neural network
20 regulator
21 rotation speed sensor
22 sensor
23 differentiator
30 input layer
31 covered layer
32 output layer
33 neuron
B desired flow value
D control deviation
dI motor current change
dU motor voltage change
dpa output pressure change
F activation function
$F_{max}$ maximum value of activation function
G gas flow
h air humidity
I motor current
kT actual point in time (time-discrete)
n fan rotation speed
pa output pressure
pe input pressure
Q volume flow rate
S threshold
$t_{akt}$ actual point in time (time-continuous)
U motor voltage
$w_i$ weight i (i=1−n)
$x_i$ neuron input value i (i=1−n)
$x_w$ weighted sum
y neuron output value

The invention claimed is:

1. A method for operating a fan system comprising a control device and a backward curved centrifugal fan having a motor and a rotor driven by the motor, wherein the fan system is configured to create a gas flow that is characterized by at least one actual flow rate value (pa(kT), Q(kT); pa($t_{akt}$), Q($t_{akt}$)), wherein the method comprises the following steps:
   determination of an operation parameter (U(kT); U($t_{akt}$)) forming a correcting variable and characterizing operation conditions of the motor of the centrifugal fan,
   determination of at least one operation parameter (I(kT); I($t_{akt}$)) forming at least one actual system variable and characterizing at least one operation condition of the motor of the centrifugal fan in a continuous or time-discrete manner,
   providing the correcting variable (U(kT); U($t_{akt}$)) and the at least one actual system variable (I(kT); I($t_{akt}$)) to an artificial neural network of the control device,
   determination of the at least one actual flow rate value (Q(kT); Q($t_{akt}$)) by the artificial neural network based on the correcting variable (U(kT); U($t_{akt}$)) and the actual system variable (I(kT); I($t_{akt}$)) and a time-dependent change (I((k−1)T); dI) of the actual system variable (I((k−1)T);dI),
   checking whether the correcting variable (U(kT); U($t_{akt}$)) has to be modified based on the determined at least one actual flow rate value (Q(kT), Q($t_{akt}$)), and
   wherein an actual flow value (pa(kT), pa($t_{akt}$)) of the at least one actual flow rate value (pa(kT), pa($t_{akt}$)) determined by the artificial neural network is fed back to an input layer of the artificial neural network.

2. The method according to claim 1, wherein the control device comprises a regulator to which a control deviation between a predefined desired flow value and the at least one actual flow rate value (Q(kT), Q($t_{akt}$)) is submitted.

3. The method according to claim 1, wherein an actual flow value of the at least one actual flow rate value determined by the artificial neural network is an actual volume flow rate value (Q(kT), Q($t_{akt}$)) and a desired flow value is a desired volume flow rate value.

4. The method according to claim 2, wherein the predefined desired volume flow rate value remains constant during operation in order to obtain a constant volume flow rate.

5. A method for operating a fan system comprising a control device and a backward curved centrifugal fan having a motor and a rotor driven by the motor, wherein the fan system is configured to create a gas flow that is characterized by at least one actual flow rate value (pa(kT), Q(kT); pa($t_{akt}$), Q($t_{akt}$)), wherein the method comprises the following steps:
   determination of an operation parameter (U(kT); U($t_{akt}$)) forming a correcting variable and characterizing operation conditions of the motor of the centrifugal fan,
   determination of at least one operation parameter (I(kT); I($t_{akt}$)) forming at least one actual system variable and characterizing at least one operation condition of the motor of the centrifugal fan in a continuous or time-discrete manner,
   providing the correcting variable (U(kT); U($t_{akt}$)) and the at least one actual system variable (I(kT); I($t_{akt}$)) to an artificial neural network of the control device,
   determination of the at least one actual flow rate value (Q(kT); Q($t_{akt}$)) by the artificial neural network based on the correcting variable (U(kT); U($t_{akt}$)) and the actual system variable (I(kT); I($t_{akt}$)) and a time-dependent change (I((k−1)T); dI) of the actual system variable (I((k−1)T);dI),
   checking whether the correcting variable (U(kT); U($t_{akt}$)) has to be modified based on the determined at least one actual flow rate value (Q(kT), Q($t_{akt}$)), and
   wherein the artificial neural network comprises an input layer to which an actual value of the at least one actual system variable (I(kT); I($t_{akt}$)) and of the correcting variable (U(kT); U($t_{akt}$)) for an actual point in time (kT) as well as a preceding value of the actual system variable (I((k−1)T)) to a preceding point in time ((k−1)T) is submitted.

6. The method according to claim 5, wherein in addition a preceding value of the correcting variable (U((k−1)T)) to a preceding point in time ((k−1)T) is submitted to the input layer.

7. The method according to claim 1, wherein the artificial neural network comprises an input layer to which an actual value of the at least one actual system variable ((I($t_{akt}$))) for an actual point in time as well as a time-dependent change of the actual system variable (dI) for the actual point in time ($t_{akt}$) is submitted.

8. The method according to claim 7, wherein in addition a time-dependent change of the correcting variable (dU) for the actual point in time ($t_{akt}$) is submitted to the input layer.

9. The method according to claim 1, wherein an actual flow value of the at least one actual flow rate value determined by the artificial neural network is an actual output pressure value (pa(kT), pa($t_{akt}$)).

10. The method according to claim 1, wherein an actual output pressure value (pa(kT), pa($t_{akt}$)) is fed back to an input layer.

11. The method according to claim 1, wherein the artificial neural network comprises neurons and wherein each neuron comprises an activation function.

12. The method according to claim 11, wherein the activation function is formed by a rectifier.

13. The method according to claim 11, wherein the activation function is limited to a maximum value ($F_{max}$).

14. The method according to claim 1, wherein the at least one actual system variable depends on a fan rotation speed or is the fan rotation speed and wherein the fan rotation speed is determined indirectly or is directly detected a rotation speed sensor.

15. A fan system comprising a control device and a backward curved centrifugal fan having a motor and a rotor driven by the motor, wherein the control device is configured to carry out the method according to claim 1.

16. The method according to claim 2, wherein an actual flow value of the at least one actual flow rate value determined by the artificial neural network is an actual volume flow rate value (Q(kT), Q($t_{akt}$)) and the predefined desired flow value is a desired volume flow rate value.

17. The method according to claim 16, wherein the desired volume flow rate value remains constant during operation in order to obtain a constant volume flow rate.

18. The method according to claim 17, wherein the artificial neural network comprises an input layer to which an actual value of the at least one actual system variable (I(kT); I($t_{akt}$)) and of the correcting variable (U(kT); U($t_{akt}$)) for an actual point in time (kT) as well as a preceding value of the actual system variable (I((k−1)T)) to a preceding point in time ((k−1)T) is submitted.

19. The method according to claim 18, wherein in addition a preceding value of the correcting variable (U((k−1)T)) to a preceding point in time ((k−1)T) is submitted to the input layer.

20. A method for operating a fan system comprising a control device and a backward curved centrifugal fan having a motor and a rotor driven by the motor, wherein the fan system is configured to create a gas flow that is characterized by at least one actual flow rate value (pa(kT), Q(kT); pa($t_{akt}$), Q($t_{akt}$)), wherein the method comprises the following steps:

determination of an operation parameter (U(kT); U($t_{akt}$)) forming a correcting variable and characterizing operation conditions of the motor of the centrifugal fan, determination of at least one operation parameter (I(kT); I($t_{akt}$)) forming at least one actual system variable and characterizing at least one operation condition of the motor of the centrifugal fan in a continuous or time-discrete manner, providing the correcting variable (U(kT); U($t_{akt}$)) and the at least one actual system variable (I(kT); I($t_{akt}$)) to an artificial neural network of the control device (11), determination of the at least one actual flow rate value (Q(kT); Q($t_{akt}$)) by the artificial neural network based on the correcting variable (U(kT); U($t_{akt}$)) and the actual system variable (I(kT); I($t_{akt}$)) and a time-dependent change (I((k−1)T); dI) of the actual system variable (I((k−1)T);dI), checking whether the correcting variable (U(kT); U($t_{akt}$)) has to be modified based on the determined at least one actual flow rate value (Q(kT), Q($t_{akt}$)), wherein the artificial neural network comprises an input layer to which an actual value of the at least one actual system variable ((I($t_{akt}$)) for an actual point in time as well as a time-dependent change of the actual system variable (dI) for the actual point in time ($t_{akt}$) is submitted, and wherein in addition a time-dependent change of the correcting variable (dU) for the actual point in time ($t_{akt}$) is submitted to the input layer.

* * * * *